United States Patent
Roy et al.

(10) Patent No.: US 12,184,616 B2
(45) Date of Patent: Dec. 31, 2024

(54) FRAMEWORK FOR CONFIGURABLE PER-SERVICE SECURITY SETTINGS IN A FORWARD PROXY

(71) Applicant: Microsoft Technology Licensing, LLC, Redmond, WA (US)

(72) Inventors: Arupendra N. Roy, Bothell, WA (US); Arun Yadav, Bothell, WA (US); Chin Pong Kwong, Issaquah, WA (US); Gerardo Diaz Cuellar, Redmond, WA (US); Alexandru Naparu, Redmond, WA (US); Jing Li, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 17/659,728

(22) Filed: Apr. 19, 2022

(65) Prior Publication Data
US 2023/0336530 A1 Oct. 19, 2023

(51) Int. Cl.
*H04L 9/40* (2022.01)
(52) U.S. Cl.
CPC ...... *H04L 63/0281* (2013.01); *H04L 63/0823* (2013.01); *H04L 63/166* (2013.01)
(58) Field of Classification Search
CPC ............. H04L 63/0281; H04L 63/0823; H04L 63/166; H04L 67/289; H04L 67/56; H04L 63/0869; H04L 63/0884
See application file for complete search history.

(56) References Cited

U.S. PATENT DOCUMENTS

| | | | |
|---|---|---|---|
| 8,060,926 B1 | 11/2011 | Ebrahimi et al. | |
| 10,291,651 B1 | 5/2019 | Chaubey | |

(Continued)

FOREIGN PATENT DOCUMENTS

CN  108616599 B  10/2021

OTHER PUBLICATIONS

"Apache Traffic Server", Retrieved on: https://docs.trafficserver.apache.org/en/9.1.x/admin-guide/security/index.en.html, Retrieved Date : Jan. 28, 2022, 6 Pages.

(Continued)

*Primary Examiner* — Amie C. Lin

(57) ABSTRACT

Examples of the present disclosure describe systems and methods for configuring and executing per-service TLS settings in a forward proxy. In examples, a proxy device receives a connection request from a client device to access a service. The proxy device identifies service connection information included in the connection request and selects a connection scheme for connecting to the service. The service connection information is compared to a static mapping of connection data in the connection scheme. If the service connection information matches the static mapping of connection data, a TLS type is determined for the connection request. If the service connection information does not match the static mapping of connection information, the service connection information is compared to a dynamic mapping of session information. Based on the comparison of the service connection information to the dynamic mapping of session information, a TLS type is determined for the connection request.

20 Claims, 13 Drawing Sheets

(56) References Cited

U.S. PATENT DOCUMENTS

| | | | |
|---|---|---|---|
| 2003/0046391 A1* | 3/2003 | Moreh | H04L 63/0281 |
| | | | 709/225 |
| 2004/0015725 A1 | 1/2004 | Boneh et al. | |
| 2014/0095865 A1* | 4/2014 | Yerra | H04L 9/3271 |
| | | | 713/156 |
| 2014/0331297 A1 | 11/2014 | Innes et al. | |
| 2015/0350343 A1* | 12/2015 | Ludwig | H04L 67/02 |
| | | | 709/226 |
| 2017/0359185 A1* | 12/2017 | Hang | H04L 9/0897 |
| 2020/0125700 A1* | 4/2020 | Chang | G06F 21/6218 |
| 2023/0396604 A1* | 12/2023 | Cho | H04L 63/0823 |

OTHER PUBLICATIONS

"Fusion Middleware Administering Oracle Traffic Director", Retrieved From: https://docs.oracle.com/middleware/12212/otd/admin/Intro.htm#TDADG-GUID-2D1A08B5-7366-40CC-83BC-7830659DDB8C, Retrieved on: Jan. 28, 2022, 11 Pages.

"SSL Forward Proxy", Retrieved From: https://web.archive.org/web/20210224233046/https:/docs.paloaltonetworks.com/pan-os/9-1/pan-os-admin/decryption/decryption-concepts/ssl-forward-proxy.html, Feb. 24, 2021, 3 Pages.

"SSL Forward Proxy (Man in the Middle)", Retrieved From: https://knowledgebase.paloaltonetworks.com/KCSArticleDetail?id=kA10g000000Cm8wCAC, Sep. 27, 2018, 1 Page.

Wang, Kaidi, "TLS Proxies and Latency They Bring", Retrieved From: https://web.archive.org/web/20201025012119/https:/networksecurityvt.github.io/blogs/TLS/TLS.html, Oct. 25, 2020, 5 Pages.

Dierks, et al., "The TLS Protocol Version 1.0", Retrieved from: https://www.rfc-editor.org/rfc/pdfrfc/rfc2246.txt.pdf, Jan. 1999, 80 Pages.

Robbins, et al., "Configure end to end TLS by using Application Gateway with PowerShell", Retrieved From: https://docs.microsoft.com/en-us/azure/application-gateway/application-gateway-end-to-end-ssl-powershell, Apr. 30, 2021, 15 Pages.

"International Search Report and Written Opinion Issued in PCT Application No. PCT/US23/012152", Mailed Date: May 8, 2023, 12 Pages.

* cited by examiner

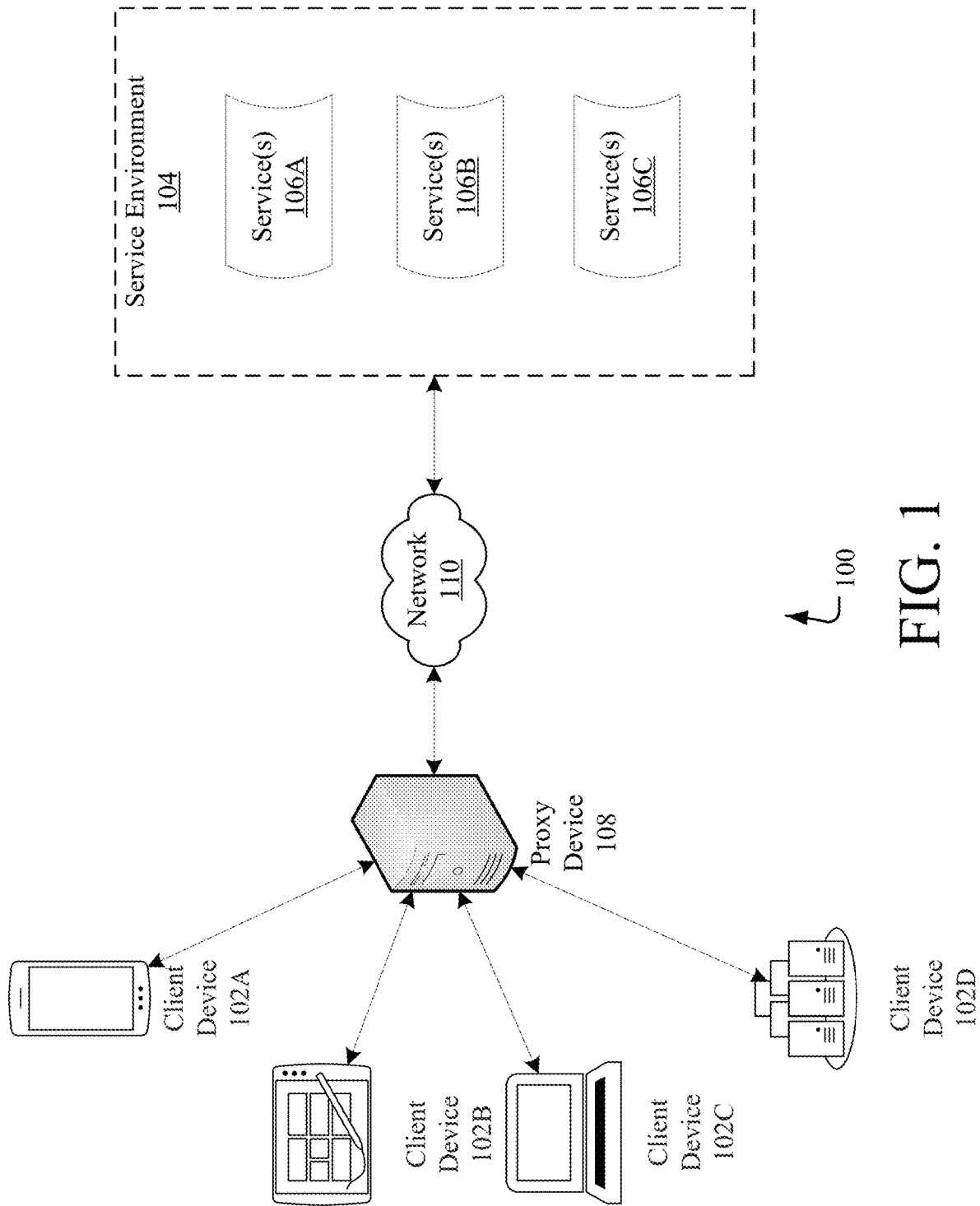

FRAMEWORK FOR CONFIGURABLE PER-SERVICE SECURITY SETTINGS IN A FORWARD PROXY

BACKGROUND

Client-service systems enable clients to connect to services using host and port information for the services. Configuring a forward proxy to facilitate communication between a client and a service is typically straightforward. However, configuring a forward proxy to decrypt the transport layer security (TLS) traffic between the client and the service can be significantly more complex.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for configuring and executing per-service TLS settings in a forward proxy. In examples, a proxy receives a connection request from a client device to access a service provided by a service environment. The proxy identifies service connection information included in the connection request and selects a connection scheme for connecting to the service. The service connection information is compared to a static mapping of connection data in the connection scheme. If the service connection information matches the static mapping of connection data, a TLS type is determined for the connection request. If the service connection information does not match the static mapping of connection information, the service connection information is compared to a dynamic mapping of session information. Based on the comparison of the service connection information to the dynamic mapping of session information, a TLS type is determined for the connection request.

Based on the determined TLS type, a determination is made regarding whether to request a TLS client certificate from the client device. If it is determined that a TLS client certificate is not to be requested from the client device, a TLS server certificate indicated by the connection scheme is provided to the client device and the client device is connected to the service based on the service connection information and validation of the TLS server certificate. If it is determined that a TLS client certificate is to be requested from the client device, a request for the TLS client certificate is made based on the TLS type. If a TLS client certificate is provided by the client, the TLS client certificate is provided to the service and a TLS server certificate indicated by the connection scheme is provided to the client device. The client device is connected to the service based on the service connection information, validation of the TLS server certificate, and validation of the TLS client certificate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

FIG. 1 illustrates an overview of an example system for configuring per-service TLS settings in a forward proxy.

DETAILED DESCRIPTION

Figure 2A:
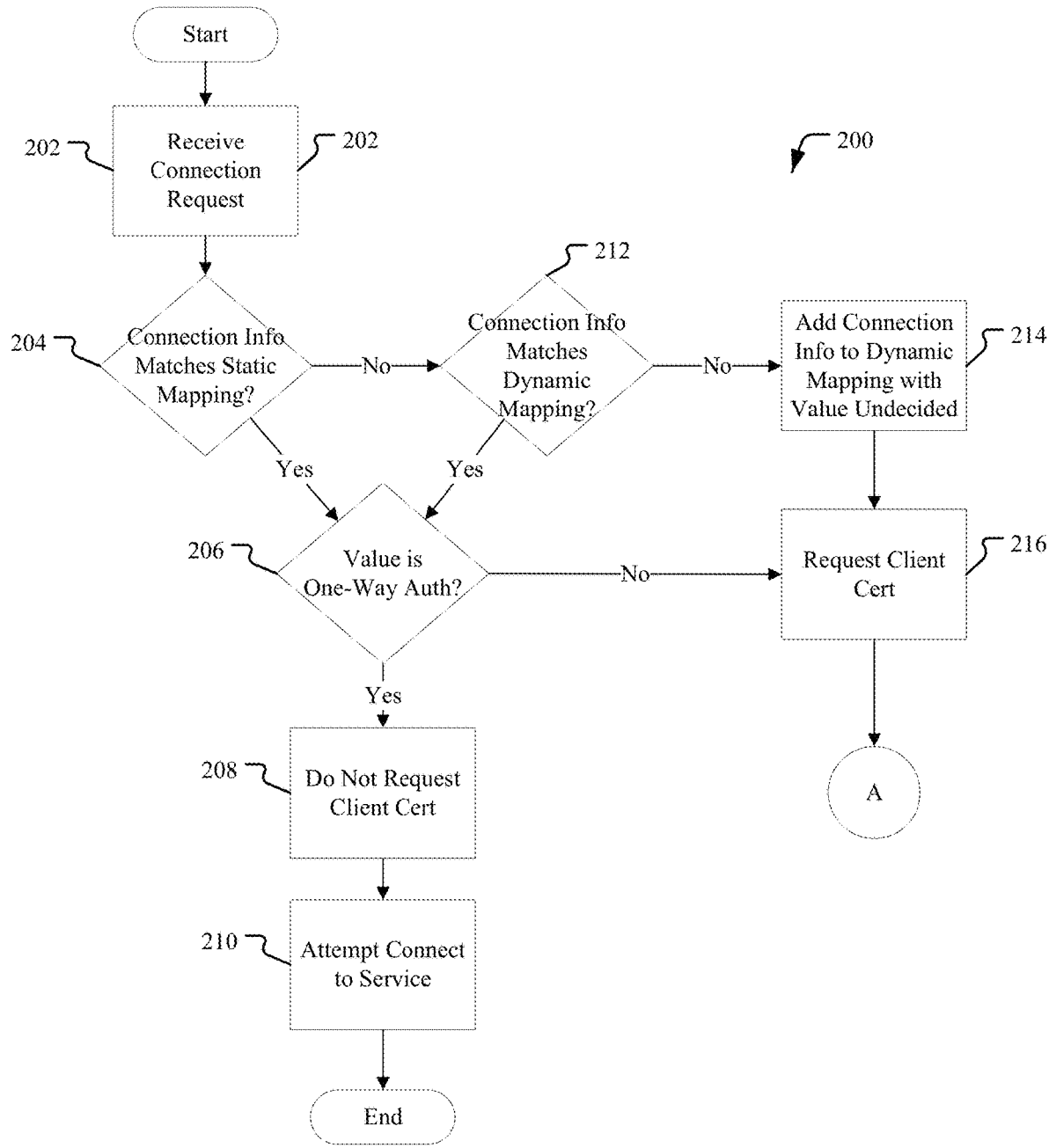
FIGS. 2A and 2B illustrate example process flows for executing per-service TLS settings in a forward proxy.

A proxy is a device or software system that acts as an intermediary for transmitting data between two or more devices (e.g., a client device and a back-end device). Proxies provide a layer of security between devices, such as a client device and a back-end device (e.g., web server, application server, database device) that provides services and content items (e.g., documents, web pages, videos, images) to the client device. A service, as used herein, refers to software that provides functionality to perform various automated tasks. Often, when a client device and a back-end device are trusted by each other, the data security implemented for transmitting data involves an exchange of predefined security credentials (e.g., security keys, tokens, or digital certificates) between the client device and the back-end device. The security credentials verify the identities of the two devices (or the users of the two devices), validates the data being transmitted, and facilitates the creation of a secure connection between the two devices.

However, when the client device and/or the back-end device do not trust the other device, a different type of data security is needed to ensure that that data being transmitted is valid and safe. As one example, a proxy can be used to terminate a data security mechanism, such as TLS or secure sockets layer (SSL), for incoming requests from untrusted client devices. Terminating the data security mechanism of an incoming request prevents a requesting client device from establishing a connection with and collecting information relating to a back-end device prior to determining whether the requesting client device is trustworthy. Terminating the data security mechanism also enables the proxy to decrypt, inspect, and validate a request payload prior to forwarding the request payload to the back-end device.

One approach to terminating a data security mechanism and validating a request payload is to implement a reverse proxy. A reverse proxy, as used herein, is a device or software system (e.g., an application or service) that is implemented as a node in front of a back-end device (e.g., application or web server). A reverse proxy intercepts an incoming request from a client device and provides the request to a back-end device, thereby preventing a client device from communicating directly with the back-end device. In the above approach, a defined hostname of the reverse proxy is bound to a server certificate. A server certificate, as used herein, is a digital certificate used to confirm the identify or authenticity of a service or device. The server certificate is issued by a trusted certificate authority (e.g., an entity that issues digital certificates) and comprises a list of domain names, hostnames, and IP addresses secured by the server certificate. Although reverse proxies provide some security benefits, implementing a reverse proxy requires performing updates to the client device(s), which can be difficult and cumbersome for users. For example, each client device connecting to the reverse proxy would need to update their settings to connect to the defined hostname bound to the server certificate.

Another approach to terminating a data security mechanism and validating a request payload is to implement a forward proxy. A forward proxy, as used herein, is a device or software system (e.g., an application or service) that is implemented as a node in front of a client device. A forward proxy intercepts a response from a back-end device and provides the response to a client device, thereby preventing a back-end device from communicating directly with a client device. When a client device in a client-service system is configured to connect to a service provided by a back-end device through a forward proxy, the application layer of the client device operates as if it is connected directly to the service at the host (e.g., Domain Name System (DNS) hostname or IP address) and port combination that defines the service.

Configuring the forward proxy to facilitate communication between the client device and the service is relatively straightforward when the forward proxy is not intended to decrypt the TLS traffic between the client device and the service. However, when the forward proxy is intended to decrypt the TLS traffic between the client device and the service, configuring the forward proxy can be significantly more complex due to the inherent tension between the role of TLS to protect against "man-in-the-middle" attacks and the role of the forward proxy to act as a trusted "man-in-the-middle." As one example, the forward proxy would have to provide a client device with a server certificate that is acceptable to (e.g., validated by) the client. The forward proxy would also have to request a client certificate from the client device when connecting to any service that requires mutual or two-way TLS authentication. A client certificate, as used herein, is a digital certificate used to confirm the identify or authenticity of a user/client device.

Moreover, many proxies (e.g., forward and reverse proxies) can only be configured to apply a single type of authentication to the communication sessions established between client devices and services. As one example, a forward proxy that is configured to provide two-way TLS authentication applies two-way TLS authentication to each connection request received by that forward proxy. As such, the forward proxy is not able to establish a communication session between client device(s) and service(s) that do not expect or support two-way TLS authentication. Consequently, a different proxy or a different communication path must be configured and maintained to enable the client device(s) and service(s) to use a different authentication scheme, such as one-way TLS authentication.

Embodiments of the present disclosure address the challenges of the above-described implementation approaches and describe systems and methods for configuring and executing per-service TLS settings in a forward proxy. In examples, a proxy receives a security protocol-based (e.g., TLS, SSL, SSH, PGP, IPsec) connection request (referred to as a "connection request") from a client device to access a service provided by a back-end device or a service environment. The connection request includes connection information (e.g., domain name, hostname, IP address, port, data transmission protocol or version) for connecting to the service. The proxy identifies and/or extracts the connection information included in the connection request. The proxy then selects a connection scheme for connecting to the service. The connection scheme may be specified by a service or the proxy device may select a connection scheme from a list of connection schemes based on the connection information. A connection scheme, as used herein, is a data structure comprising information, such as a scheme identifier, a static mapping of connection information, an identifier of a device role or function and/or a corresponding port, a set of connection settings (e.g., security and encoding or decoding schemes, options for enabling or disabling communication session security, certificate properties, user agent string, content length and type, acceptable media types and languages for a response), an identifier of a server certificate or server certificate location, and one or more Subject Alternative Names (SANs) protected by the server certificate. A SAN, as used herein, is an additional domain name, hostname, or IP address that is secured by a digital certificate.

The connection information in the connection request is compared to the static mapping of connection information in the selected connection scheme. In some examples, a static mapping of connection information includes a pattern corresponding to the service or the back-end device providing the service. In some examples, the comparison includes using a pattern matching mechanism (e.g., regular expressions, string searching algorithms, pattern recognition models) to match the connection information in a connection request to the pattern. In examples, the pattern includes content (e.g., alphanumeric characters, special characters, operators) corresponding to a domain name, a hostname, an IP address, a device role or function, and/or a port number. If it is determined that the connection information matches the pattern, a TLS type indicated by connection settings in the selected connection scheme is determined for the connection request. For instance, the connection settings of a connection scheme indicate a TLS type of "one-way" authentication or "two-way" authentication. One-way authentication (or "server-only authentication"), as used herein, refers to a process in which a client device validates a server certificate of a service or back-end device. Two-way authentication (or "mutual authentication"), as used herein, refers to a process in which a client device validates a server certificate of a service or back-end device, and the service or back-end device validates a client certificate of the client device.

If the connection information does not match the pattern, the connection information is compared to a dynamic mapping of session information. A dynamic mapping of session information, as used herein, is a data structure or file comprising session information relating to communication sessions or attempted communication sessions between client devices and a service. In examples, session information comprises connection information for a client device, an identifier of a service or back-end device to which a client device attempts to establish a communication session, a TLS type used for a communication session, and/or date/time information for the communication session. A dynamic mapping of session information may be stored locally by a proxy (e.g., in memory or another data storage location of the proxy device) or stored remotely to a proxy (e.g., in a back-end device, a client device, or an intermediate device). In examples, the comparison of the connection information to the dynamic mapping of session information may include using a pattern matching mechanism discussed above to match connection information in a connection request to connection information in a dynamic mapping of session information.

If it is determined that the connection information in a connection request matches the connection information in a dynamic mapping of session information (indicating that a currently requesting client device has connected to or attempted to connect to the service during a previous communication session), the TLS type listed in the dynamic mapping of session information for the previous communication session is determined for the current connection request. For instance, if the client device previously connected to a service using one-way TLS authentication, the proxy device will assign one-way TLS authentication to the current connection request to access the service. If it is determined that the connection information in a connection request does not match the connection information in a dynamic mapping of session information, the connection information in the connection request and an indication that the TLS type for the connection request is currently unknown are added to the dynamic mapping of session information.

Based on the determined TLS type for the connection request, a determination is made regarding whether to request a client certificate from the client device. In examples, a client certificate is not requested from the client device if the TLS type is determined to be one-way TLS authentication. However, a client certificate is requested from the client device if the TLS type is determined to be two-way TLS authentication or unknown.

If it is determined that a client certificate is not to be requested from the client device, a server certificate indicated by the connection scheme is provided to the client device. In examples, the server certificate is included in the connection scheme, retrieved from a storage location in the proxy, retrieved from a storage location external to the proxy device (via, for example, an URL), or generated in real-time by the proxy. If the client device validates the server certificate (e.g., determines the server certificate is acceptable), the proxy connects the client device to the service using the connection information in the connection request.

If it is determined that a client certificate is to be requested from the client device, the proxy requests the client certificate from the client device based on the TLS type. If a client certificate is provided by the client device to the proxy, the proxy provides the client certificate to the service and provides a server certificate indicated by the connection scheme to the client device. If the client device determines the server certificate is acceptable and the service determines the client certificate is acceptable, the proxy connects the client device to the service based on the connection information in the connection request.

However, if a client certificate is not provided by the client device to the proxy in response to the request (indicating that the client device does not expect or support two-way authentication when connecting to the service or that two-way authentication is currently unavailable), the proxy updates the TLS type stored in the dynamic mapping of session information. For example, the proxy updates the dynamic mapping of session information such that a stored TLS type of "two-way authentication" or "unknown authentication" is updated to "one-way authentication." The proxy then provides a server certificate indicated by the connection scheme to the client device. Alternatively, the proxy may provide the server certificate to the client device prior to updating the dynamic mapping of session information. If the client device determines the server certificate is acceptable, the proxy connects the client device to the service using the connection information in the connection request.

In examples, connecting the client device to the service includes applying connection settings of the connection scheme to the communication session. As one example, a connection scheme includes a connection setting for enabling termination of communication session security, such as TLS and SSL. If the connection setting for enabling termination of communication session security is disabled (thereby preventing communication session security from being disabled), a proxy is unable to terminate TLS for incoming connection requests or decrypt connection request payloads. However, if the connection setting for enabling termination of communication session security is enabled, a proxy is able to terminate TLS for incoming connection requests and decrypt connection request payloads. Decrypting the connection request payloads enables the proxy to inspect and validate a connection request payload prior to the payload reaching the intended service. Thus, such connection settings enable the proxy to provide additional security for communication sessions. Further, connection settings for one or more services that communicate with client devices via the same proxy may vary. For example, a first service may determine that TLS for incoming requests should be decrypted and a second service may determine that TLS for incoming requests should not be decrypted. Accordingly, the proxy also provides for setting and storing TLS settings on a per-service basis.

Thus, the present disclosure provides a plurality of technical benefits and improvements over previous data security solutions. These technical benefits and improvements include: terminating TLS for incoming requests from untrusted clients, decrypting TLS traffic to inspect and validate incoming request payloads, enabling per-service TLS setting configuration in a forward proxy, enabling dynamic detection of stored TLS session information, and enabling dynamic updating of stored TLS session information based on client certificate requests provided to client devices, among other examples.

FIG. 1 illustrates an overview of an example system for configuring and executing per-service TLS settings in a forward proxy. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, components of systems disclosed herein are implemented on a single processing device. The processing device may provide an operating environment for software components to execute and utilize resources or facilities of such a system. An example of processing device(s) comprising such an operating environment is depicted in FIGS. 6-9. In another example, the components of systems disclosed herein are distributed across multiple processing devices. For instance, input may be entered on a user device or client device and information may be processed on or accessed from other devices in a network, such as one or more remote cloud devices or web server devices.

In FIG. 1, system 100 comprises client devices 102A, 102B, 102C, and 102D (collectively "client device(s) 102"), service environment 104, service(s) 106A, 106B, and 106C (collectively "service(s) 106"), proxy 108, and network 110. One of skill in the art will appreciate that the scale and structure of systems such as system 100 may vary and may include additional or fewer components than those described in FIG. 1. As one example, system 100 may comprise additional proxies, networks, service environments, and/or services.

Client device(s) 102 may be configured to detect and/or collect input data from one or more users or user devices. In some examples, the input data corresponds to user interaction with one or more software applications or services implemented by, or accessible to, client device(s) 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. The input data may include, for example, voice input, touch input, text-based input, gesture input, video input, and/or image input. The input data may be detected/collected using one or more sensor components of client device(s) 102. Examples of sensors include microphones, touch-based sensors, geolocation sensors, accelerometers, optical/magnetic sensors, gyroscopes, keyboards, and pointing/selection tools.

Client device(s) 102 may be further configured to store or access a client certificate (or other predefined security credential) that confirms the identify or authenticity of client device(s) 102. In one example, the client certificate is stored in memory or another data storage location of client device(s) 102. In another example, client device(s) 102 retrieve the client certificate from an external storage location. Client device(s) 102 may provide the client certificate in order to establish a communication session between client device(s) 102 and a service 106. For instance, client device(s) 102 may provide the client certificate in response to receiving a request from a proxy device to provide the client certificate. Examples of client device(s) 102 include personal computers (PCs), mobile devices (e.g., smartphones, tablets, laptops, personal digital assistants (PDAs)), server devices, wearable devices (e.g., smart watches, smart eyewear, fitness trackers, smart clothing, body-mounted devices, head-mounted displays), gaming consoles or devices, and Internet of Things (IoT) devices.

In examples, client device(s) 102 transmit information associated with collected input data and/or a client certificate as one or more payloads. A payload may comprise data corresponding to an event, an entity, a transaction, or other information associated with an activity. In one example, a payload comprises a connection request to establish a communication session between a client device and a service provided by a back-end device. The connection request includes connection information for connecting to the service. In another example, a payload comprises a client certificate or a portion thereof. Client device(s) 102 transmit the payloads to and receive response data from service environment 104 via proxy 108.

Service environment 104 is configured to provide client device(s) 102 access to various computing services and resources (e.g., applications, devices, storage, processing power, networking, analytics, intelligence). Service environment 104 may be implemented in a cloud-based or server-based environment using one or more computing devices, such as back-end devices (e.g., web servers, file servers, application servers, database servers), personal computers (PCs), virtual devices, and mobile devices. The computing devices may comprise one or more sensor components, as discussed with respect to client device(s) 102. Service environment 104 may comprise numerous hardware and/or software components and may be subject to one or more distributed computing models/services (e.g., Infrastructure as a Service (IaaS), Platform as a Service (PaaS), Software as a Service (SaaS), Functions as a Service (FaaS)). In aspects, service environment 104 comprises or provides access to service(s) 106.

Service(s) 106 may be integrated into (e.g., hosted by or installed in) service environment 104. Alternatively, one or more of service(s) 106 may be implemented externally to service environment 104. Service(s) 106 may provide access to a set of software and/or hardware functionality. Examples of service(s) 106 include word processing services, spreadsheet services, presentation services, document-reader services, social media software or platforms, search engine services, media software or platforms, multimedia player services, content design software or tools, database software or tools, provisioning services, and alert or notification services.

Proxy 108 is configured to facilitate a communication session between client device(s) 102 and service(s) 106. In examples, proxy 108 provides a service configuration mechanism. The service configuration mechanism enables service(s) 106 to register connection settings for accessing service(s) 106 with proxy 108 using a declarative and extensible connection scheme. In examples, a connection scheme includes a static mapping of connection information, a set of connection settings, and an identifier of a server certificate or server certificate location. Registering a connection scheme with proxy 108 causes proxy 108 to use the connection scheme when a connection request for service(s) 106 is received. In some examples, service(s) 106 register multiple connection schemes with proxy 108 to account for different scenarios. For instance, different connection schemes may be used on specific days, during specific time periods of a day, when computing resource usage (e.g., CPU, memory, storage) exceeds a threshold level, during periods of high or low network latency, or to retrieve certificates from various locations. In examples, service(s) 106 specify a connection scheme to be used to connect to service(s) 106 or criteria for selecting a connection scheme for connecting to service(s) 106. Proxy 108 stores the specified connection scheme or criteria for selecting a connection scheme in the connection settings for service(s) 106.

Proxy 108 is further configured to receive a connection request from client device(s) 102 to connect to service(s) 106. Upon receiving a connection request, proxy 108 identifies and/or extracts connection information included in the connection request. Proxy 108 selects a connection scheme for connecting client device(s) 102 to service(s) 106 in accordance with the connection settings for service(s) 106. The connection information in the connection request is compared to the static mapping of connection information in the selected connection scheme. As one example, pattern matching techniques are applied to the connection information to match a hostname, IP Address, device function/role, and/or a port included in the connection information to a stored pattern for the hostname and port of service(s) 106. For instance, a connection request for a service includes the connection information "CONNECT www.contoso.com: 443 HTTP/1.1." The connection scheme for the service includes a static mapping comprising the pattern "[^:]+ \\.contoso\\. com:443." Pattern matching techniques, such as regular expressions (RegEx), are used to match the hostname and port in the connection information to the hostname and port in the pattern. If the connection information in the connection request matches the static mapping of connection information, proxy 108 assigns the TLS type indicated by the selected connection scheme to the connection request.

Proxy 108 maintains a dynamic mapping of session information for client device(s) 102 connecting (or attempting to connect) to service(s) 106 via proxy 108. For each attempt by client device(s) 102 to connect to service(s) 106, proxy 108 records an entry comprising an identifier of a device requesting the connection, connection information for a service to which the device is attempting to connect, and a TLS type associated the requested connection. In examples, if proxy 108 determines that connection information in a connection request does not match a static mapping of connection information, proxy 108 compares the connection information to the dynamic mapping of session information. As one example, pattern matching techniques are applied to the connection information to match a hostname, IP Address, device function or role, and/or a port included in the connection information to an entry in the dynamic mapping of session information. For instance, a connection request includes the connection information "CONNECT 40.113.200.201:443 HTTP/1.1." The dynamic mapping of session information includes the entry "<Computer-55><40.113.200.201:443><Jan. 5 2020><one-way TLS>," where "Computer-55" is the name of client device requesting the connection, "40.113.200.201:443" is connection information for a service, "Jan. 5, 2020" is the date of the previous communication session between the client device and the service, and "one-way TLS" is the TLS authentication type used during the previous communication session. Pattern matching techniques are used to match the IP address and port in the connection information to the IP address and port in the entry. In examples, if the connection information matches an entry in the dynamic mapping of session information, proxy 108 assigns the TLS type indicated by the entry to the connection request. However, if the connection information does not match an entry in the dynamic mapping of session information, proxy 108 adds an entry to the dynamic mapping of session information for the current connection attempt. A value indicating the TLS type for the connection request is unknown is added to the entry.

Proxy 108 is further configured to provide certificates to one or more devices. In examples, proxy 108 selectively requests a client certificate from client device(s) 102 based on a TLS type determined for the connection request. As one example, proxy 108 does not request a client certificate from client device(s) 102 if the TLS type is determined to be one-way authentication. However, proxy 108 requests a client certificate from client device(s) 102 if the TLS type is determined to be two-way authentication or unknown. In examples where proxy 108 does not request a client certificate from client device(s) 102, a server certificate indicated by the selected connection scheme is provided to client device(s) 102. In examples, proxy 108 retrieves the server certificate from a store location or generates the server certificate in real-time. If client device(s) 102 determines the server certificate is acceptable, proxy 108 establishes a communication session between the client device(s) 102 and service(s) 106 via network 110. Examples of network 110 include a private area network (PAN), a local area network (LAN), a wide area network (WAN), and the like. Although network 110 is depicted as a single network, it is contemplated that network 110 may represent several networks of similar or varying types. As one example, network 110 may comprise a LAN connecting client device(s) 102 to proxy 108 and a WAN connecting proxy 108 to service(s) 106.

If proxy 108 requests and receives a client certificate from client device(s) 102, proxy 108 provides the client certificate to service(s) 106 and provides a server certificate indicated by the selected connection scheme to client device(s) 102. If client device(s) 102 determines the server certificate is acceptable and service(s) 106 determines the client certificate is acceptable, proxy 108 connects the client device(s) 102 to service(s) 106 using the connection information. However, if proxy 108 requests but does not receive a client certificate from client device(s) 102, proxy 108 updates the TLS type stored in the dynamic mapping of session information. As one example, proxy 108 updates a stored TLS type of "two-way authentication" or "unknown authentication" to "one-way authentication." After (or before) updating the TLS type stored in the dynamic mapping of session information, proxy 108 provides a server certificate indicated by the selected connection scheme to client device(s) 102. If client device(s) 102 determines the server certificate is acceptable, proxy 108 establishes a communication session between the client device(s) 102 and service(s) 106.

In examples, proxy 108 terminates TLS for a received connection request to service(s) 106 in accordance with the connection settings for service(s) 106. As one example, a connection scheme includes the connection setting "EnableSslTermination: true," which enables proxy 108 to terminate SSL and TLS for communications sessions for a particular service. Based on this connection setting, proxy 108 terminates TLS for an incoming connection request from an untrusted client. Terminating TLS enables proxy 108 to decrypt the connection request and validate the connection request payload. If proxy 108 determines the connection request payload includes undeliverable content (e.g., malicious, unauthorized, or incorrectly formatted content), proxy 108 prevents the connection request payload from being transmitted to the service or terminates the connection request for the untrusted client. In one example, proxy 108 validates the connection request payload using data security or analysis software, services, or devices. If proxy 108 determines the connection request payload does not include undeliverable content, proxy 108 transmits the connection request payload to the service.

Figure 2B:
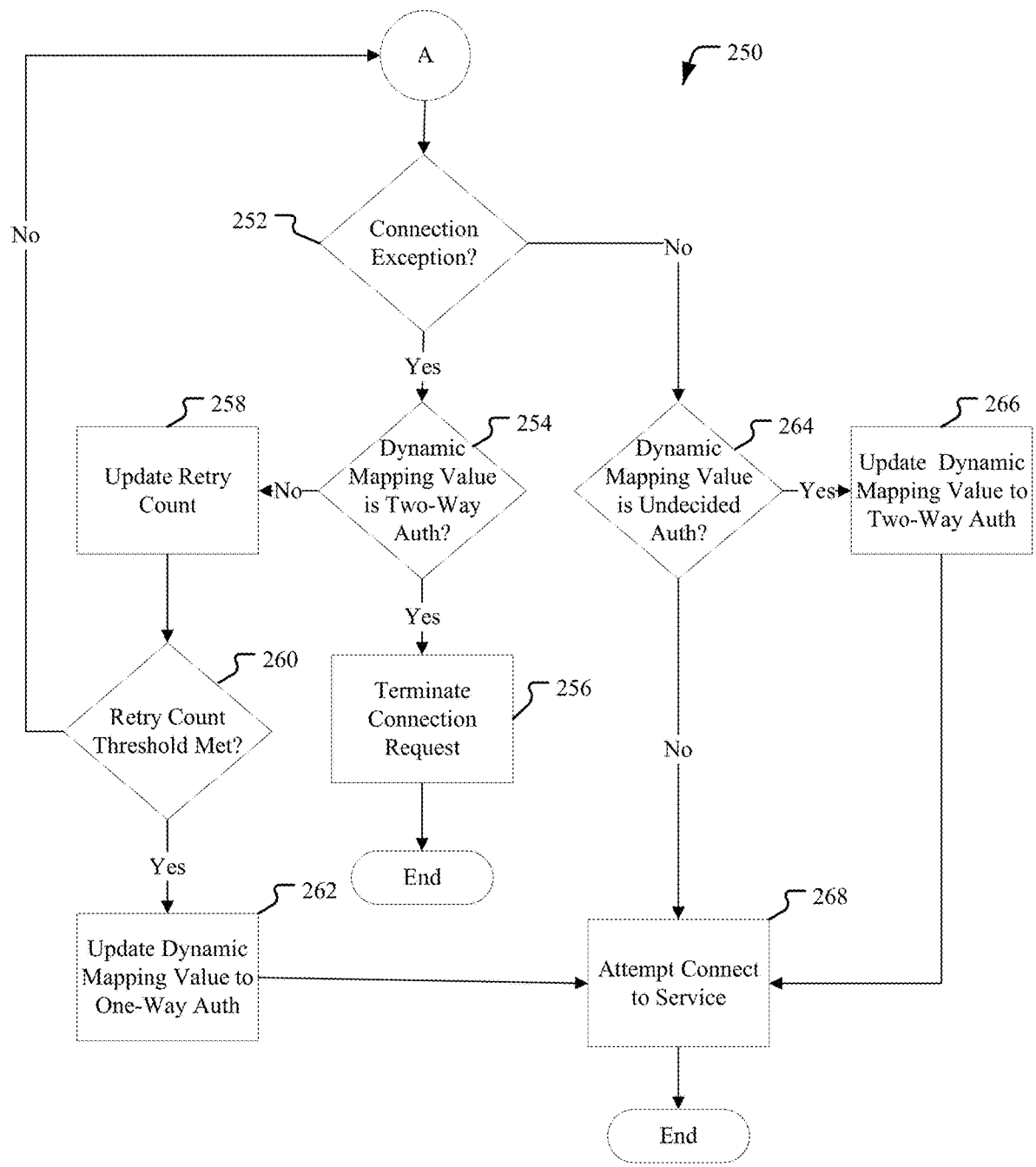

FIGS. 2A and 2B illustrate example process flows for executing per-service TLS settings in a forward proxy. Although examples in FIGS. 2A and 2B and subsequent figures will be discussed in the context of a forward proxy, the examples may be applicable to other types of proxies, such as SSL proxies, shared proxies, distorting proxies, rotating proxies, and reverse proxies.

As indicated in FIG. 2A, example process flow 200 begins at operation 202, where a forward proxy receives a connection request from a client device. In process flow 200, the connection request is intended to connect the client device to a service hosted by a back-end device. At decision operation 204, forward proxy determines whether the connection information (e.g. hostname, IP address, port) in the connection request matches the static mapping of connection information included in a connection scheme used to connect to the service. If the connection information in the connection request matches the static mapping of connection information, flow proceeds to decision operation 206. At decision operation 206, the forward proxy determines whether the connection scheme specifies that one-way authentication is used to connect to the service. If the connection scheme specifies that one-way authentication is used to connect to the service, flow proceeds to operation 208. At operation 208, the forward proxy determines that a client certificate will not be requested from the client device. Process flow 200 then proceeds to operation 210, where the forward proxy attempts to establish a communication session between the client device and the service. The client device validates the server certificate and provides an indication of the validation to the forward proxy. In examples, validating the server certificate includes determining whether the current date is within a validation period of the server certificate, determining whether the server certificate was issued by a trusted certificate authority, determining whether a public key of issuing certificate authority validates a digital signature of the issuing certificate authority, and/or determining whether the domain name listed in the server certificate matches the domain name associated with the service. In examples where the client device validates the server certificate, the forward proxy connects to the service on behalf of the client device using the connection information.

Alternatively, if, at decision operation 206, the connection scheme does not specify that one-way authentication is used to connect to the service, flow proceeds to operation 216. At operation 216, the forward proxy device determines that a client certificate will be requested from the client device. Process flow 200 then proceeds from operation 216 to example process flow 250 of FIG. 2B.

If, at decision operation 204, the connection information in the connection request does not match the static mapping of connection information, flow proceeds to decision operation 212. At decision operation 212, the forward proxy determines whether the connection information (e.g. hostname, IP address, port) in the connection request matches the dynamic mapping of session information for devices that have previously connected to (or attempted to connect to) the service. If the connection information in the connection request matches the dynamic mapping of session information, flow proceeds to decision operation 206. Process flow 200 then proceeds from decision operation 206 as discussed above. However, if the connection information in the connection request does not match the dynamic mapping of session information, flow proceeds to operation 214. At operation 214, the forward proxy adds an entry in the dynamic mapping of session information for the connection request. The entry includes the connection information in the connection request and an indication that the authentication to be used for the connection request is undecided. Process flow 200 then proceeds to operation 216. At operation 216, the forward proxy determines that a client certificate will be requested from the client device. Process flow 200 then proceeds from operation 216 to example process flow 250 of FIG. 2B.

In FIG. 2B, the forward proxy described in FIG. 2A has sent a request for a client certificate to the client device. Example process flow 250 begins at decision operation 252, where the forward proxy determines whether a connection exception is received from the client device. In process flow 250, a connection exception indicates that an error has occurred with the request for the client certificate. In one example, the client device provides an error to the forward proxy when the client device unexpectedly receives a request for a client certificate from the forward proxy. In another example, the forward proxy receives an error due to an interrupted connection between the forward proxy and the client device or other network-related issues.

If the forward proxy determines that a connection exception is received from the client device, flow proceeds to decision operation 254. At decision operation 254, the forward proxy determines whether the dynamic mapping of session information indicates that two-way authentication was previously used to connect to the service. If the forward proxy determines that the authentication value for connecting to the service is set to two-way authentication, flow proceeds to operation 256. At operation 256, the forward proxy terminates the current connection request.

However, if the forward proxy determines that the authentication value for connecting to the service is not set to two-way authentication (e.g., the authentication value is set to "Undecided"), flow proceeds to operation 258. At operation 258, a retry counter indicating the number of connection attempts for the current connection request is updated (e.g., incremented). At decision operation 260, the forward proxy determines whether a retry counter maintained by the forward proxy has met a predetermined retry threshold. If the forward proxy determines that the retry threshold has not been met, the forward proxy sends another request for the client certificate to the client device and flow proceeds to decision operation 252. However, if the forward proxy determines that the retry threshold has been met, flow proceeds to operation 262. At operation 262, the forward proxy updates the entry in the dynamic mapping of session information for the connection request such that the stored authentication value is set to one-way authentication. Flow then proceeds to operation 268.

If, at decision operation 252, the forward proxy determines that a connection exception is not received from the client device, flow proceeds to decision operation 264. At decision operation 264, the forward proxy determines whether the dynamic mapping of session information indicates that the authentication value used to connect to the service is undecided. If the forward proxy determines that the authentication value for connecting to the service is not set to undecided (e.g., the authentication value is currently set to two-way authentication), flow proceeds to operation 268. However, if the forward proxy determines that the authentication value for connecting to the service is set to undecided, flow proceeds to operation 266. At operation 266, the forward proxy updates the entry in the dynamic mapping of session information for the connection request such that the stored authentication value is set to two-way authentication. Flow then proceeds to operation 268. At operation 268, the forward proxy attempts to establish a communication session between the client device and the service based on the connection information in the connection request and validation of the client certificate and the server certificate, as discussed in FIG. 1.

In other embodiments, flow proceeds to operation 268 if the forward proxy determines that the authentication value for connecting to the service is set to undecided. Flow then proceeds to operation 266.

Having described one or more systems that may be employed by the aspects disclosed herein, this disclosure will now describe one or more methods that may be performed by various aspects of the disclosure. In aspects, methods 300-700 may be executed by a system, such as system 100 of FIG. 1. However, methods 300-700 are not limited to such examples. In other aspects, methods 300-700 are performed by a single device or component that integrates the functionality of the components of system 100. In at least one aspect, methods 300-700 are performed by one or more components of a distributed network, such as a web service or a distributed network service (e.g. cloud service).

Figure 3:
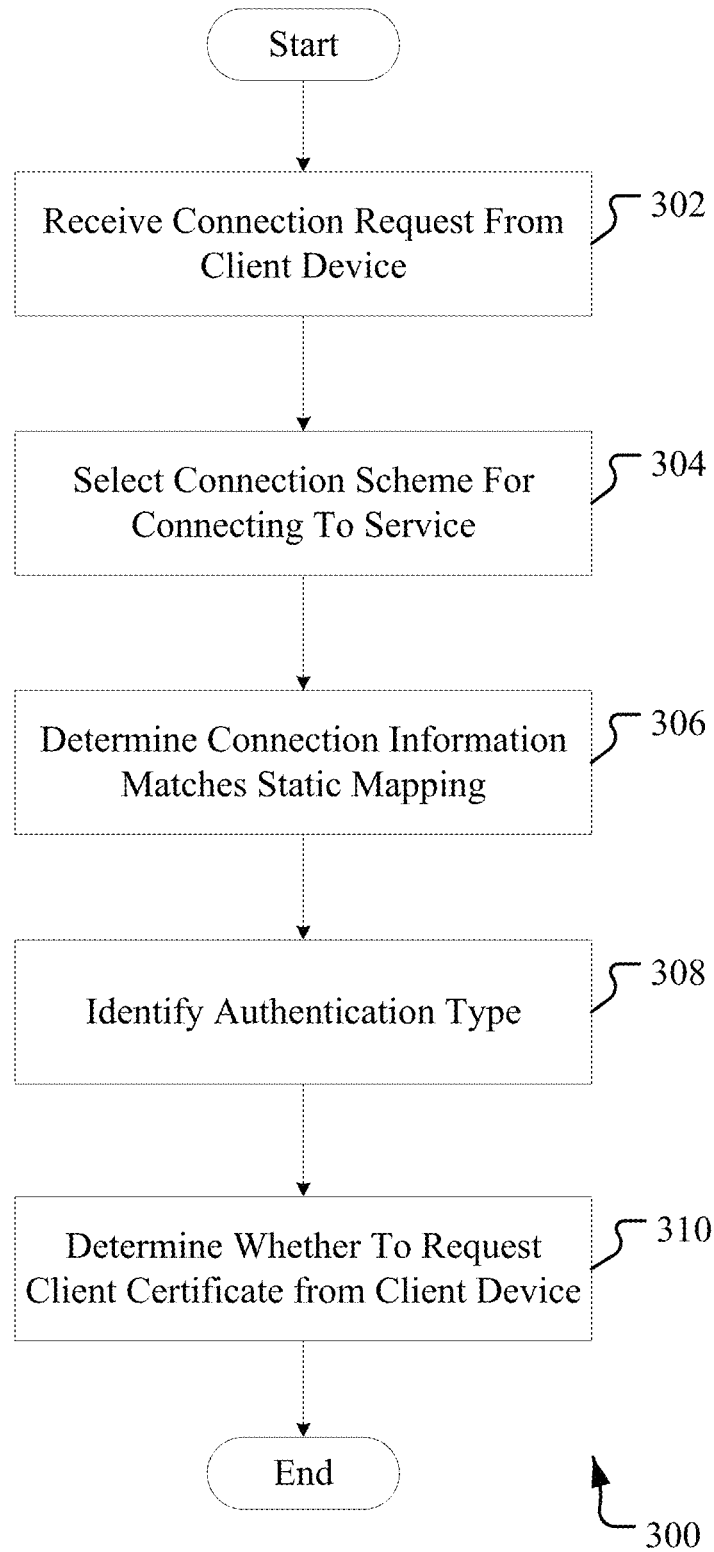
FIG. 3 illustrates an example method for executing per-service TLS settings in a forward proxy.

FIG. 3 illustrates an example method for executing per-service TLS settings in a forward proxy. Example method 300 begins at operation 302, where a forward proxy, such as proxy 108, receives a TLS-based connection request from a client device, such as client device(s) 102. In examples, the connection request is intended to access a service, such as service(s) 106, provided by a back-end device or a service environment, such as service environment 104. The connection request comprises connection information for connecting to the service, such as a domain name, a hostname, an IP address, or a port.

At operation 304, the forward proxy selects a connection scheme for connecting to the service. The connection scheme includes a static mapping of connection information, a device role or function and/or a corresponding port, connection settings, an identifier of a server certificate or server certificate location, and/or one or more Subject Alternative Names (SANs) protected by the server certificate. In examples, the connection scheme is defined by the service as part of a process for registering the service with the forward proxy device. Registering a connection scheme with the forward proxy device enables the service to specify a connection scheme or criteria for selecting a connection scheme to be used by the forward proxy device to establish a communication session between the client device and the requested service.

At operation 306, the forward proxy determines the connection information in the connection request matches a static mapping of connection information in the connection scheme for the requested service. In examples, the determination is based on the use of pattern matching techniques to match the connection information in a connection request to a pattern corresponding to the service. For instance, a hostname in received connection information is evaluated against a pattern indicating one or more portions of a hostname that defines a service. In one example, the comparison includes evaluating a stored mapping of connection information to device roles/functions. For instance, an IP address in received connection information is evaluated against a mapping data structure (e.g., table, array, document) comprising mappings or links between IP addresses and internal device roles/ports for a service or back-end device. If the IP address in the received connection information matches an IP address in the mapping data structure, the internal device role and port corresponding to the IP address is identified.

At operation 308, the forward proxy identifies an authentication type indicated by the connection scheme. In examples, the type of authentication to be used in a communication session between a client device and a service is specified in the connection scheme. For instance, a connection scheme for a service comprises an authentication connection setting, such as "<TlsType: Mutual>" or "<TlsType: OneWay>." In one example, a connection scheme for a service does not comprise an authentication connection setting or the authentication connection setting is empty. In another example, a connection scheme for a service comprises an ambiguous or unspecified authentication connection setting, such as "Unknown" or "Undecided." The forward proxy device assigns the authentication connection setting identified by the connection scheme to the received connection request.

At operation 310, the forward proxy determines whether to request a client certificate from the client device based on the authentication type. In examples, if the identified authentication type indicates one-way authentication is to be used to connect to the service, the forward proxy determines that a client certificate will not be requested from the requesting client device. The forward proxy provides a server certificate indicated by the connection scheme to the client device and establishes a communication session between the client device and the service. However, if the identified authentication type indicates two-way authentication is to be used to connect to the service, the forward proxy determines that a client certificate will be requested from the client device. The forward proxy requests the client certificate from the client device, provides the client certificate to the service, and provides a server certificate indicated by the connection scheme to the client device. The forward proxy then establishes a communication session between the client device and the service. In examples, the forward proxy determines whether to request a client certificate based on decision logic, a set of rules, or other decision-making criteria stored by or accessible to forward proxy.

Figure 4:
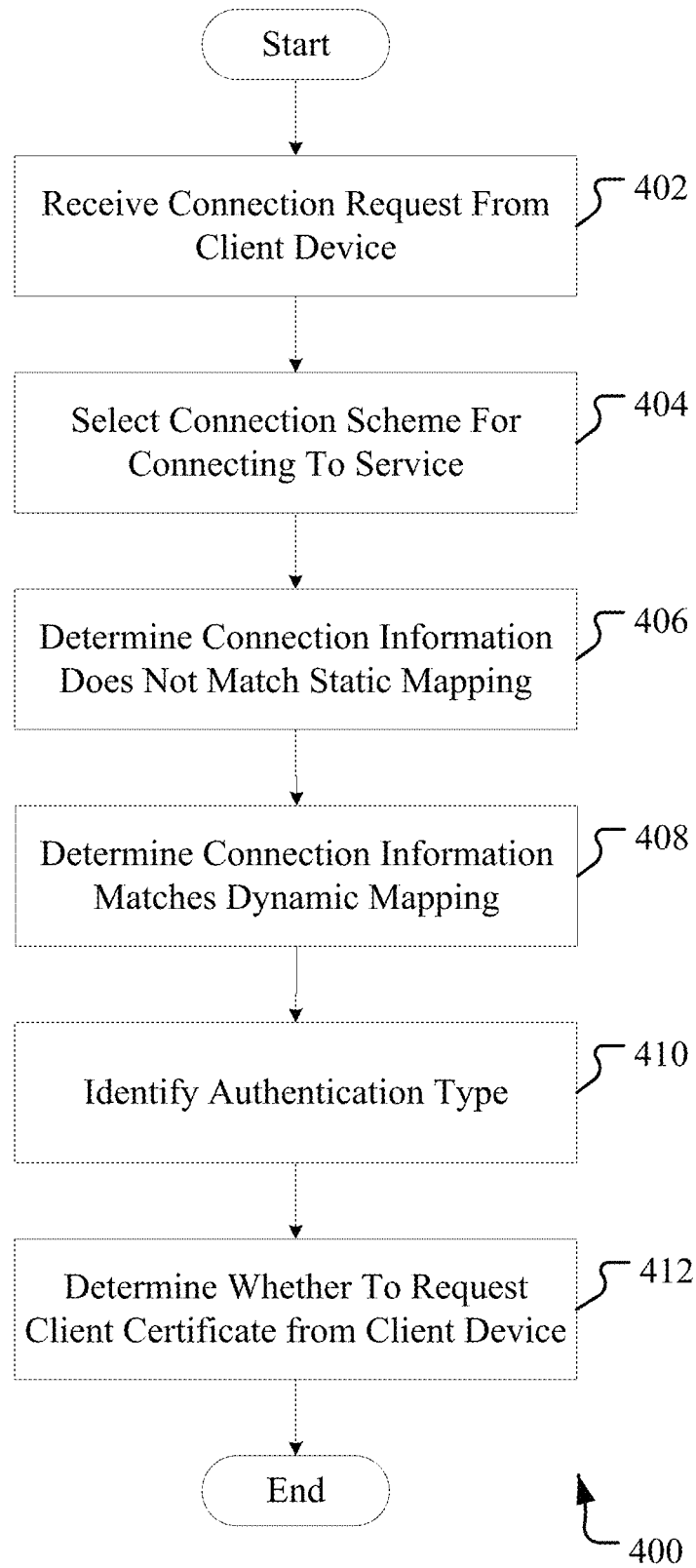
FIG. 4 illustrates a first alternative example method for executing per-service TLS settings in a forward proxy.

FIG. 4 illustrates a first alternative example method for executing per-service TLS settings in a forward proxy. Example method 400 begins at operation 402, where a forward proxy receives a TLS-based connection request from a client device, as discussed with respect to operation 302 of FIG. 3. At operation 404, the forward proxy selects a connection scheme for connecting to the service, as discussed with respect to operation 304 of FIG. 3.

At operation 406, the forward proxy determines the connection information in the connection request does not match a static mapping of connection information in the connection scheme for the requested service. In examples, the determination is based on the use of pattern matching techniques to compare the connection information in a connection request to a pattern corresponding to the service. As one example, the connection information in a connection request comprises an IP address and a pattern in the static mapping of connection information of the connection scheme is configured to detect a hostname for a service. As a result, the forward proxy uses a pattern matching algorithm to determine the IP address does not to match the pattern for the hostname.

At operation 408, the forward proxy determines the connection information in the connection request matches a dynamic mapping of session information for the requested service. In examples, the dynamic mapping of session information comprises entries for client device(s) that previously connected to or attempted to connect to a service using the forward proxy. At least some of the entries comprise information indicating the authentication type used during a previous communication session between a client device and a service. For instance, an entry may indicate an authentication type is one-way, two-way, or unknown. In examples, the determination that the connection information matches the dynamic mapping of session information is based on the use of pattern matching techniques to match the connection information in a connection request to an entry in the dynamic mapping of session information. For instance, a string-matching utility is used to match a hostname and port in received connection information to an entry in the dynamic mapping of session information comprising the same hostname and port. In one example, a string-matching utility is used to match connection information in the connection request and an identifier of the requesting client device to an entry in the dynamic mapping of session information comprising the same information.

In some examples, the forward proxy identifies multiple entries in the dynamic mapping of session information that match the connection information in the connection request (referred to as "matching entries"). For instance, the dynamic mapping of session information may comprise matching entries indicating that a client device has previously connected to a service on multiple occasions. In such examples, the forward proxy may select one of the matching entries based on predefined rules or criteria, such as most recent connection request or most frequently occurring authentication type in the matching entries. In one example, matching entries indicate that multiple client devices have previously connected to a service on multiple occasions. In such an example, the forward proxy may select an entry corresponding to the requesting client device or an entry corresponding to any other client device.

At operation 410, the forward proxy identifies an authentication type indicated by the dynamic mapping of session information. In examples, the authentication type used in a previous communication session between a client device and a service is identified in the matching entry. For instance, a matching entry indicates that one-way authentication was previously used for a communication session. Accordingly, the forward proxy assigns one-way authentication to the communication session for the current connection request.

At operation 412, the forward proxy determines whether to request a client certificate from the client device based on the authentication type, as discussed with respect to operation 302 of FIG. 3.

Figure 5:
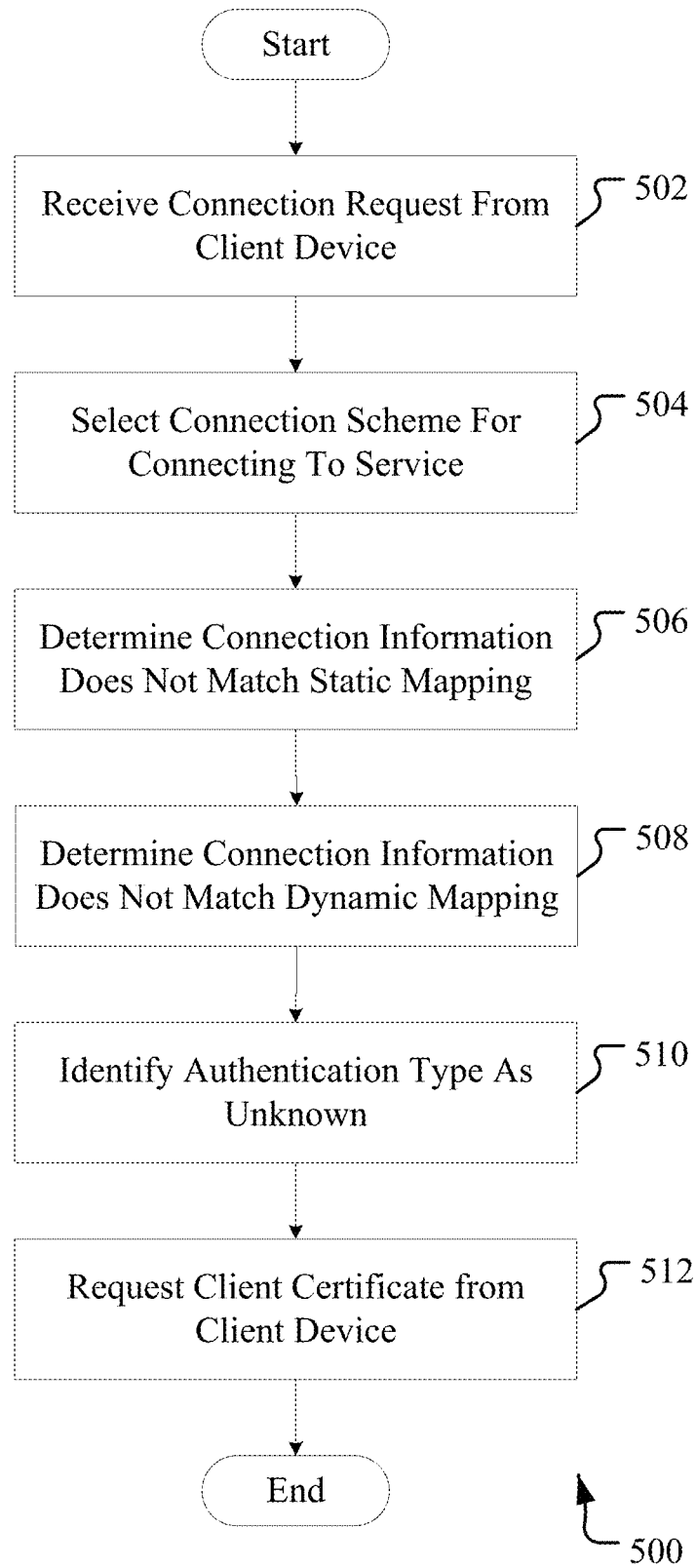
FIG. 5 illustrates a second alternative example method for executing per-service TLS settings in a forward proxy.

FIG. 5 illustrates a second alternative example method for executing per-service TLS settings in a forward proxy. Example method 500 begins at operation 502, where a forward proxy receives a TLS-based connection request from a client device, as discussed with respect to operation 302 of FIG. 3. At operation 504, the forward proxy selects a connection scheme for connecting to the service, as discussed with respect to operation 304 of FIG. 3. At operation 506, the forward proxy determines the connection information in the connection request does not match a static mapping of connection information in the connection scheme for the requested service, as discussed with respect to operation 406 of FIG. 4.

At operation 508, the forward proxy determines the connection information in the connection request does not match a dynamic mapping of session information for the requested service. In examples, the determination is based on the use of pattern matching techniques to compare the connection information in a connection request to the entries of dynamic mapping of session information. As one example, a client device attempts to connect to a service for the first time. In light of this initial connection attempt, the dynamic mapping of session information does not include a previous entry for the client device. Accordingly, the pattern matching techniques used by the forward proxy do not identify a matching entry for the client device. As another example, a new service is provided by a back-end device. As no client devices have previously connected to the service, the dynamic mapping of session information does not include entries for the service. Accordingly, the pattern matching techniques used by the forward proxy do not identify a matching entry for the service.

At operation 510, the forward proxy indicates the authentication type is unknown for the current connection request. In examples, in response to determining the connection information does not match the dynamic mapping of session information, the forward proxy adds the connection information to the dynamic mapping of session information. For instance, the forward proxy inserts an entry comprising connection information and/or an identifier for the client device into the dynamic mapping of session information. The portion of the entry that identifies the authentication type is set to a value indicating that the authentication type for connecting to the service is not currently known, such as "unknown" or "undecided."

At operation 512, the forward proxy requests a client certificate from the client device. In examples, the forward proxy requests a client certificate based on the determined authentication type. For instance, if the authentication type for connecting to the service is unknown (e.g., is not known to be one-way authentication or two-way authentication), the forward proxy requests a client certificate from the client device. In some examples, upon receiving the client certificate, the forward proxy provides the client certificate to the service and provides a server certificate indicated by the connection scheme to the client device. In other examples, the forward proxy provides a server certificate to the client device prior to or subsequent to receiving the client certificate. For instance, the forward proxy may provide a server certificate to the client device upon receiving the connection request or after the service has verified the client certificate.

Figure 6:
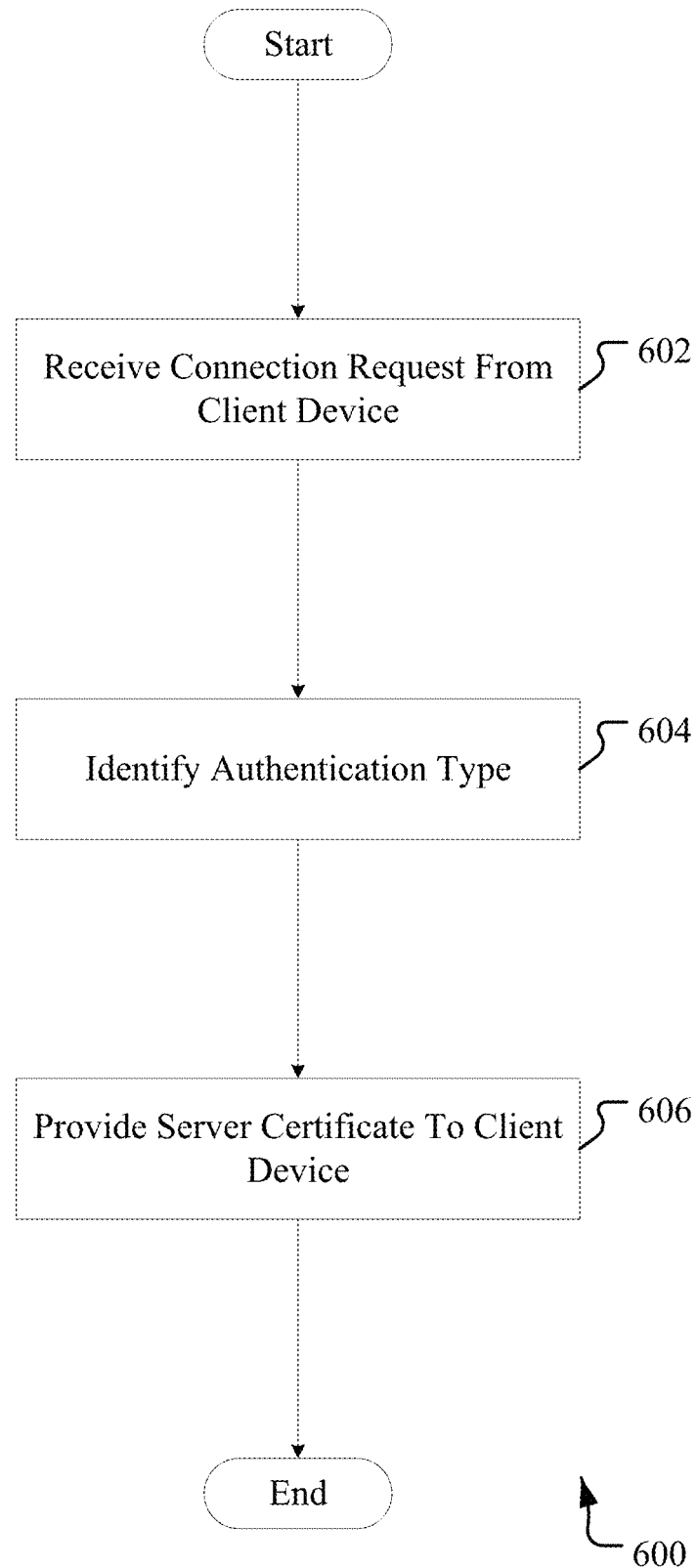
FIG. 6 illustrates a third alternative example method for executing per-service TLS settings in a forward proxy.

FIG. 6 illustrates a third alternative example method for executing per-service TLS settings in a forward proxy. Example method 600 begins at operation 602, where a forward proxy receives a TLS-based connection request from a client device, as discussed with respect to operation 302 of FIG. 3.

At operation 604, the forward proxy identifies an authentication type for the connection request. In one example, the authentication type is identified based on a comparison of the connection information in the connection request to a static mapping of connection information in a connection scheme associated with the service indicated by the connection request. For instance, if the connection information is determined to match the static mapping of connection, the forward proxy identifies an authentication type indicated by the connection scheme, as discussed with respect to operation 308 of FIG. 3. Alternatively, if the connection information is determined to not match the static mapping of connection, the forward proxy evaluates a dynamic mapping of session information for the requested service and indicates an authentication type for the connection request, as discussed with respect to operations 408 and 410 of FIG. 4.

At operation 606, the forward proxy provides a server certificate to the client device based on the authentication type, as discussed with respect to operation 310 of FIG. 3.

Figure 7:
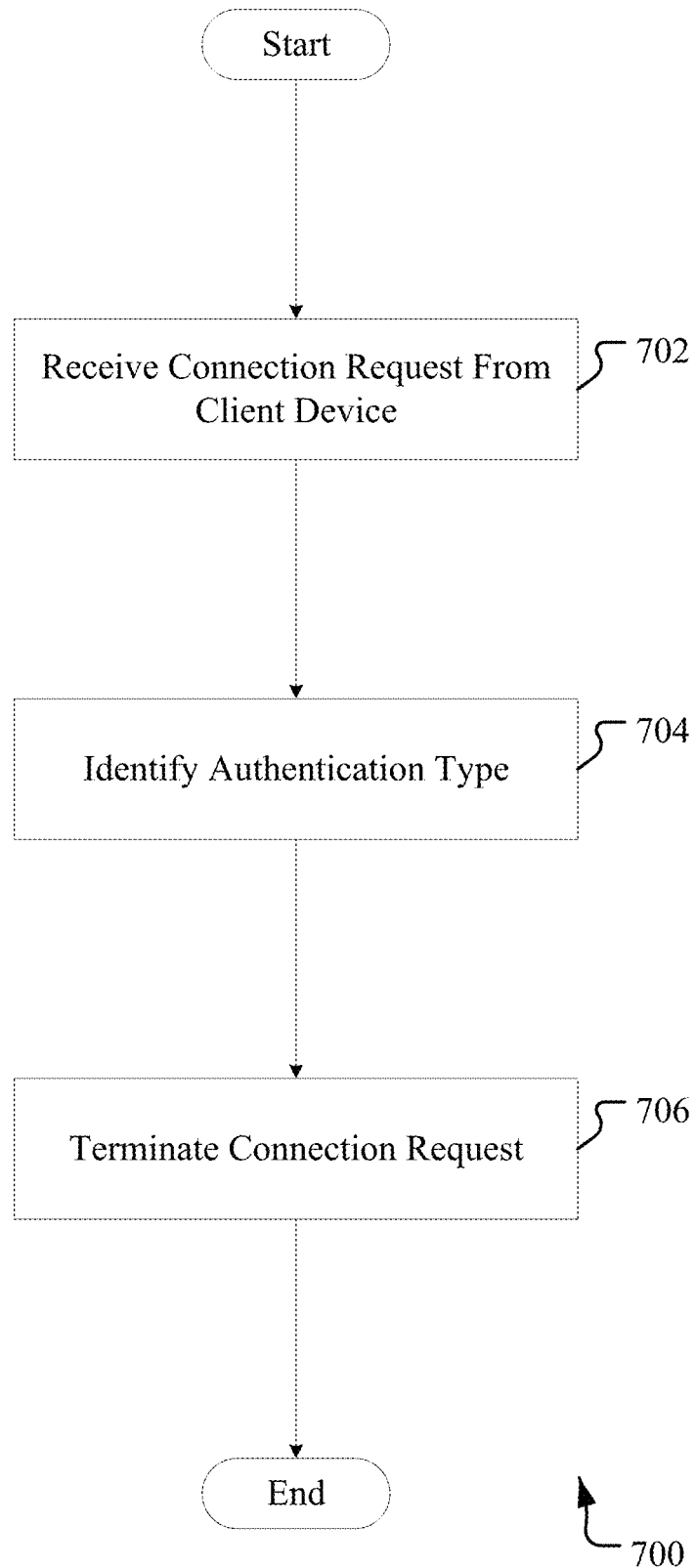
FIG. 7 illustrates a fourth alternative example method for executing per-service TLS settings in a forward proxy.

FIG. 7 illustrates a fourth alternative example method for executing per-service TLS settings in a forward proxy. Example method 700 begins at operation 702, where a forward proxy receives a TLS-based connection request from a client device, as discussed with respect to operation 302 of FIG. 3. At operation 704, the forward proxy identifies an authentication type for the connection request, as discussed with respect to operation 604 of FIG. 6.

At operation 706, the forward proxy terminates the connection request. In examples, the forward proxy can terminate the connection request for various reasons. As one example, the forward proxy will terminate the connection request if the server certificate is not validated by the client device or the client certificate is not validated by the service. As another example, the forward proxy will terminate the connection request if a connection exception is received from the client device in response to sending a request for a client certificate to the client device. For instance, the forward proxy may send a request for a client certificate to the client device in response to determining the authentication type for a connection request is not one-way authentication (e.g., the authentication type is mutual authentication or undecided). If the forward proxy receives a connection exception from the client device in response to the request for the client certificate, the forward proxy determines whether the dynamic mapping of session information associated with the service indicates that two-way authentication was previously used to connect to the service. If the forward proxy determines that two-way authentication was previously used to connect to the service, the forward proxy terminates the connection request (as the client device is expected to provide a client certificate when two-way authentication is used).

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration, and, as is understood, a vast number of computing device configurations may be utilized for practicing aspects of the disclosure, described herein.

Figure 8:
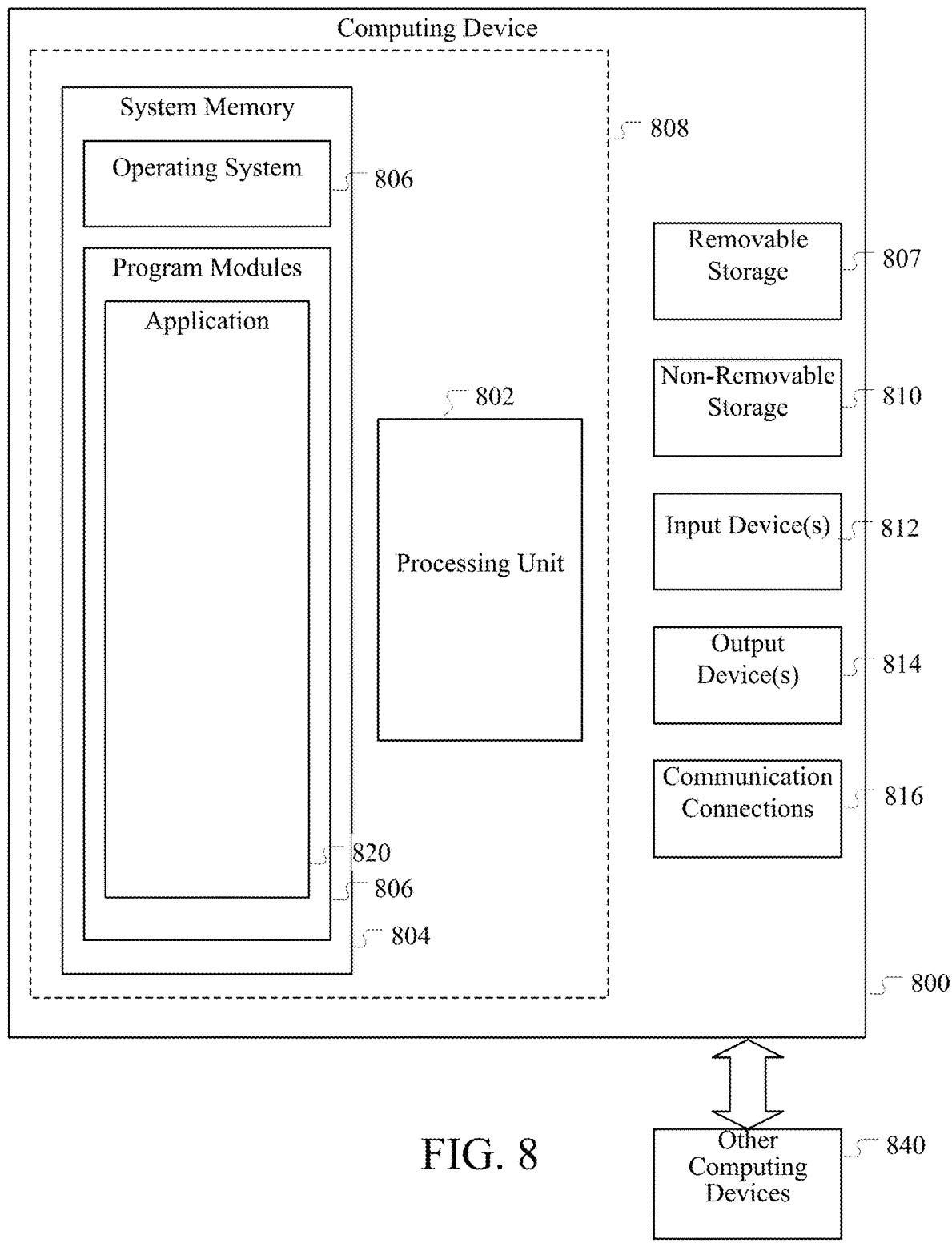
FIG. 8 is a block diagram illustrating example physical components of a computing device for practicing aspects of the disclosure.

FIG. 8 is a block diagram illustrating physical components (e.g., hardware) of a computing device 800 with which aspects of the disclosure may be practiced. The computing device components described below may be suitable for the computing devices and systems described above. In a basic configuration, the computing device 800 includes at least one processing unit 802 and a system memory 804. Depending on the configuration and type of computing device, the system memory 804 may comprise volatile storage (e.g., random access memory), non-volatile storage (e.g., read-only memory), flash memory, or any combination of such memories.

The system memory 804 includes an operating system 805 and one or more program modules 806 suitable for running software application 820, such as one or more components supported by the systems described herein. The operating system 805, for example, may be suitable for controlling the operation of the computing device 800.

Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may include additional data storage devices (removable and/or non-removable) such as, for example, magnetic disks, optical disks, tape, and other computer readable media. Such additional storage is illustrated in FIG. 8 by a removable storage device 807 and a non-removable storage device 810.

The term computer readable media as used herein includes computer storage media. Computer storage media includes volatile and nonvolatile, removable and non-removable media implemented in any method or technology for storage of information, such as computer readable instructions, data structures, or program modules. The system memory 804, the removable storage device 807, and the non-removable storage device 810 are all computer storage media examples (e.g., memory storage). Computer storage media may include random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

As stated above, a number of program modules and data files may be stored in the system memory 804. While executing on the processing unit 802, the program modules 806 (e.g., application 820) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. Output device(s) 814 such as a display, speakers, a printer, etc. may also be included. The aforementioned devices are examples and others may be used. The computing device 800 may include one or more communication connections 816 allowing communications with other computing devices 840. Examples of suitable communication connections 816 include radio frequency (RF) transmitter, receiver, and/or transceiver circuitry; universal serial bus (USB), parallel, and/or serial ports.

Figure 9A:
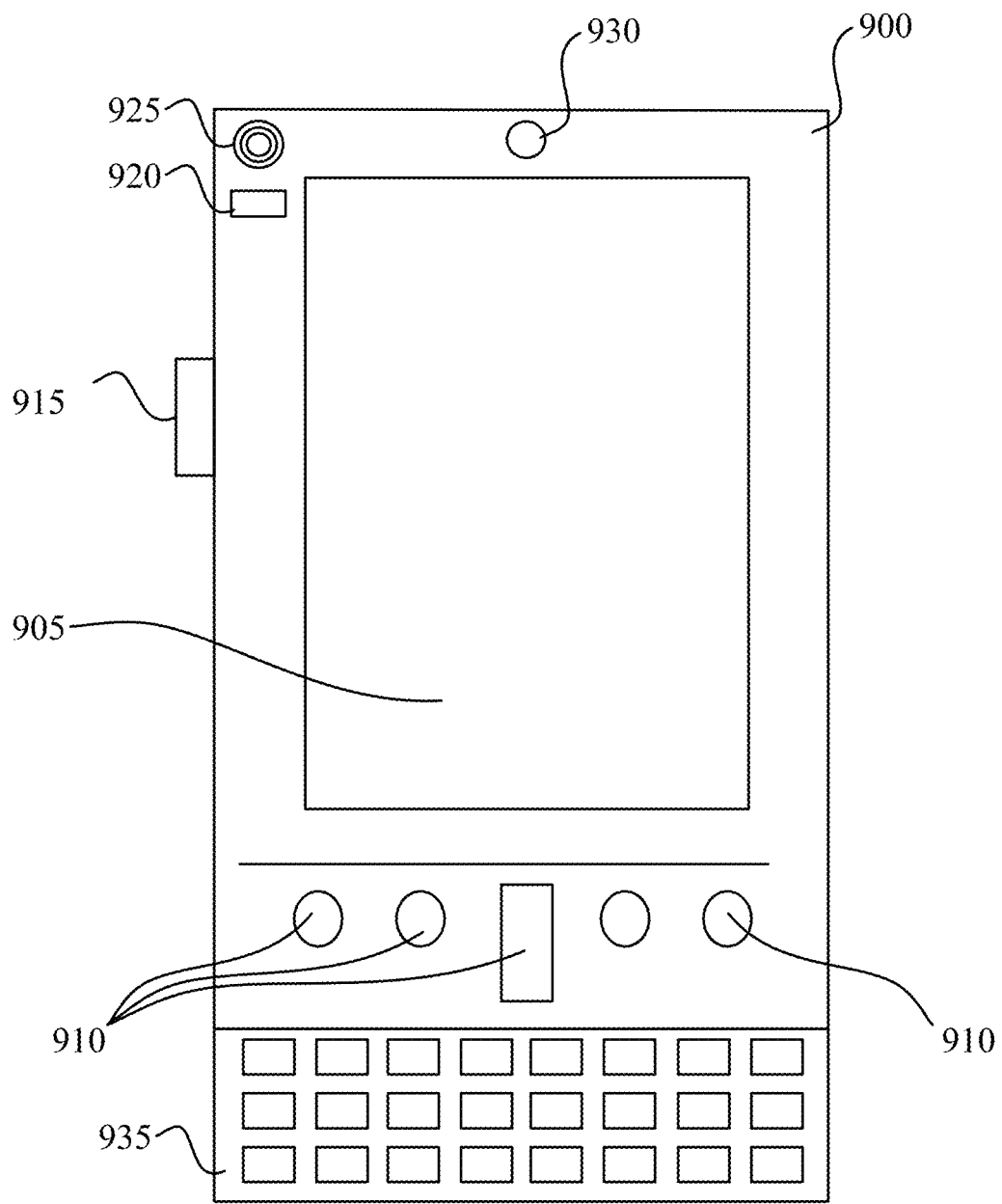
FIGS. 9A and 9B are simplified block diagrams of an example mobile computing device for practicing aspects of the present disclosure.
Figure 9B:
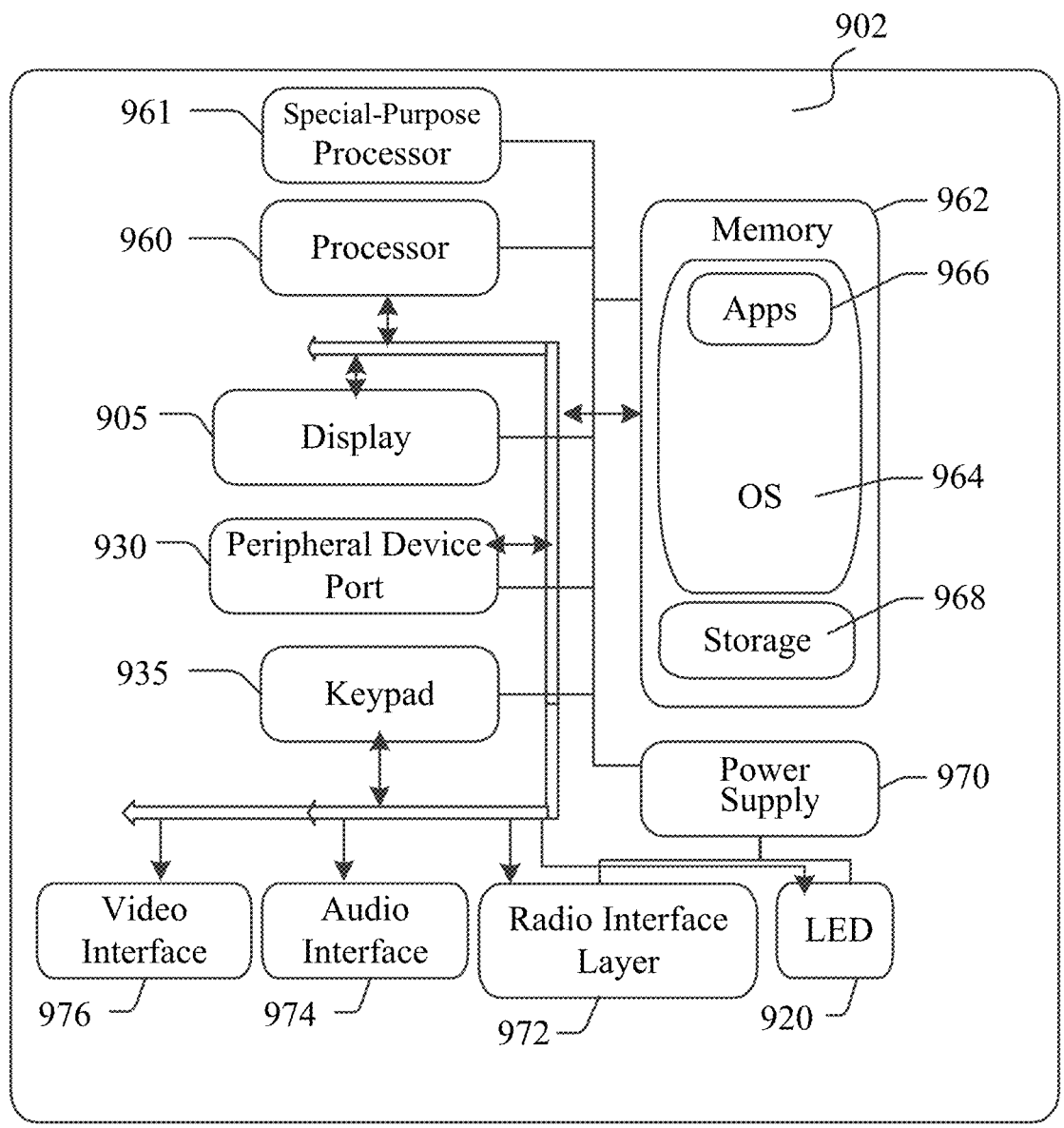

FIGS. 9A and 9B illustrate a mobile computing device 900, for example, a mobile telephone (e.g., a smart phone), wearable computer (such as a smart watch), a tablet computer, a laptop computer, and the like, with which embodiments of the disclosure may be practiced. In some aspects, the client device is a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and may include one or more input buttons 910 that allow the user to enter information into the mobile computing device 900. The display 905 of the mobile computing device 900 may also function as an input device (e.g., a touch screen display).

If included, an optional side input element 915 allows further user input. The side input element 915 may be a rotary switch, a button, or any other type of manual input element. In alternative aspects, mobile computing device 900 incorporates more or less input elements. For example, the display 905 may not be a touch screen in some embodiments.

In yet another alternative embodiment, the mobile computing device 900 is a mobile telephone, such as a cellular phone. The mobile computing device 900 may also include an optional keypad 935. Optional keypad 935 may be a physical keypad or a "soft" keypad generated on the touch screen display.

In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system (OS) 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device described herein (e.g., search engine, extractor module, relevancy ranking module, answer scoring module).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the OS 964, and vice versa.

The visual indicator (e.g., light emitting diode (LED) 920) may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor(s) (e.g., processor 960 and/or special-purpose processor 961) and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone also serves as an audio sensor to facilitate control of notifications, as will be described below. The system 902 may further include a video interface 976 that enables an operation of a peripheral device port 930 (e.g., an on-board camera) to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data may be readily transferred between computing devices for storage and use according to well-known data transfer and storage means, including electronic mail and collaborative data sharing systems.

Figure 10:
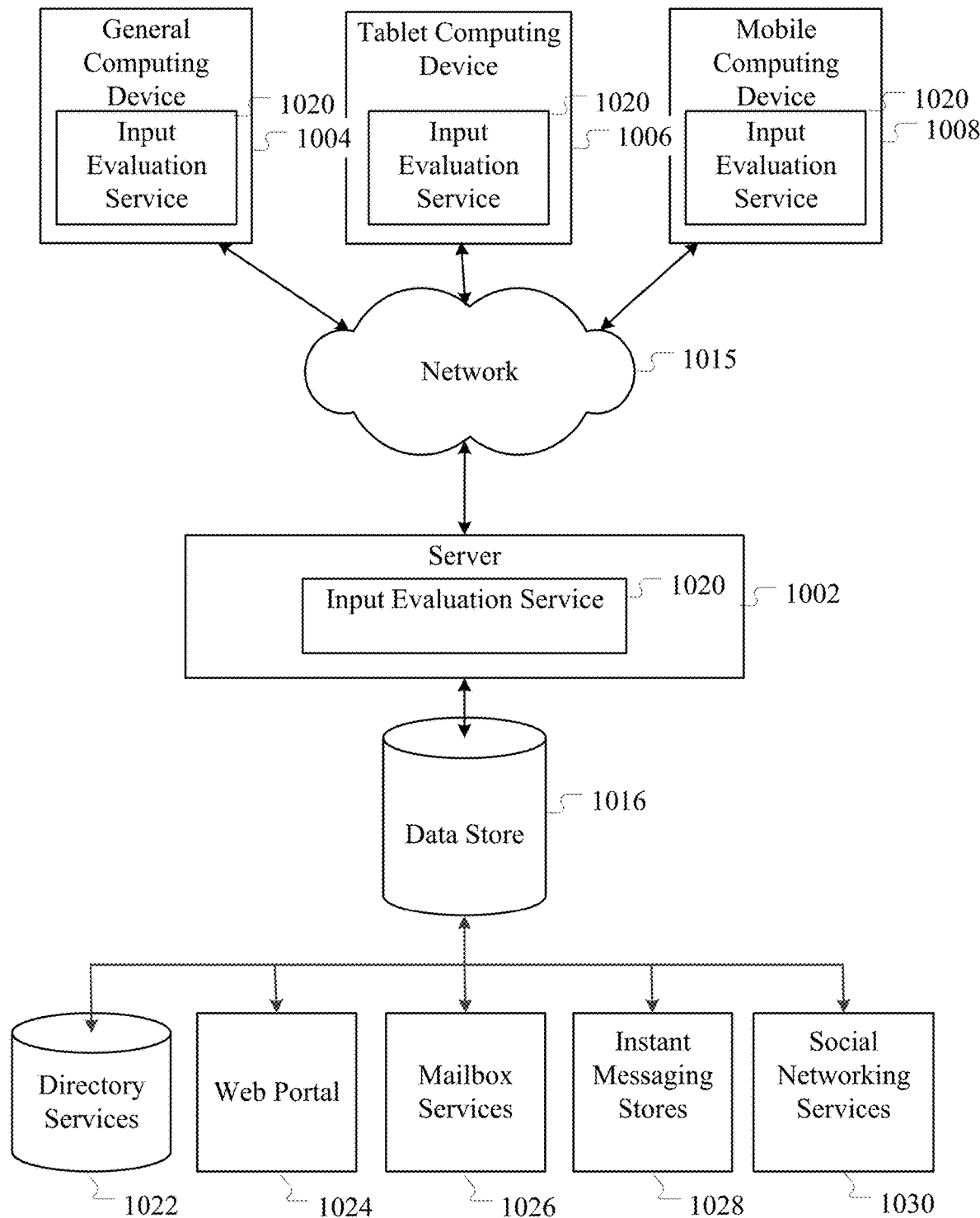
FIG. 10 is a simplified block diagram of an example distributed computing system for practicing aspects of the present disclosure.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using directory services 1022, web portals 1024, mailbox services 1026, instant messaging stores 1028, or social networking services 1030.

An input evaluation service 1020 may be employed by a client that communicates with server device 1002, and/or input evaluation service 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the data store 1016, in addition to receiving graphical data useable to be either pre-processed at a graphic-originating system, or post-processed at a receiving computing system.

Figure 11:
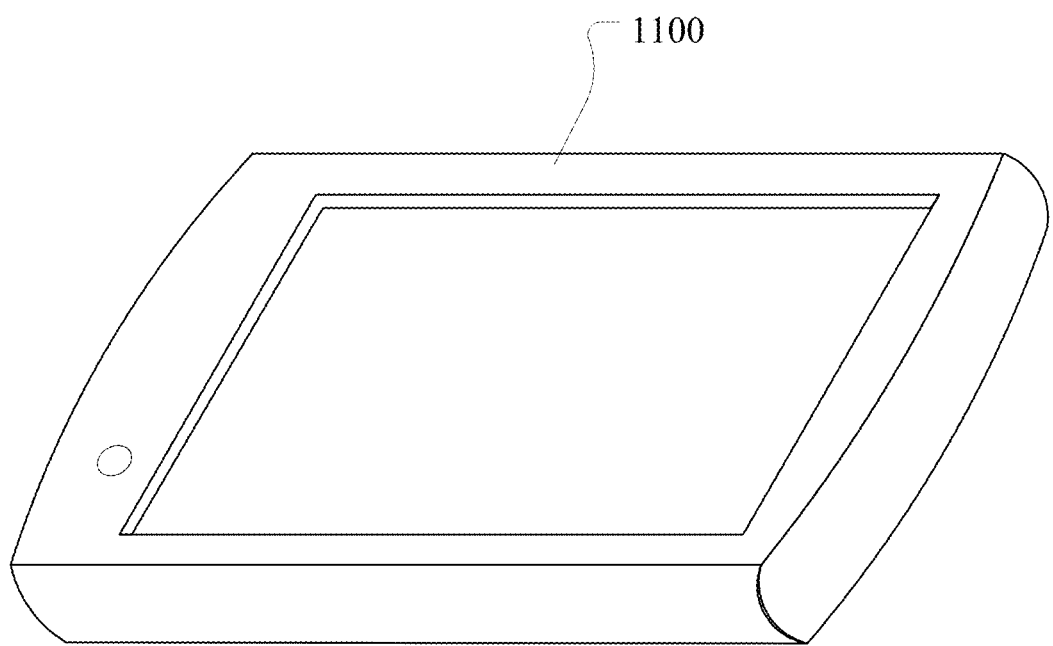
FIG. 11 illustrates an example tablet computing device for executing one or more aspects of the present disclosure.

FIG. 11 illustrates an example of a tablet computing device 1100 that may execute one or more aspects disclosed herein. In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one example of the technology relates to a system comprising: a processor; and memory coupled to the processor, the memory comprising computer executable instructions that, when executed by the processor, perform a method. The method comprises: receiving, by a forward proxy device, a connection request from a client device, the connection request comprising connection information for connecting to a service; selecting, by the forward proxy device, a connection scheme for connecting the client device to the service; determining the connection information matches a static mapping of connection information in the connection scheme; identifying an authentication type indicated by the connection scheme; and determining whether to request a client certificate from the client device based on the authentication type.

In another example, the technology relates to a system comprising: a processor; and memory coupled to the processor, the memory comprising computer executable instructions that, when executed by the processor, perform a method. The method comprises: receiving, by a forward proxy device, a connection request from a client device, the connection request comprising connection information for connecting to a service; selecting, by the forward proxy device, a connection scheme for connecting the client device to the service; determining the connection information does not match a static mapping of connection information in the connection scheme; determining the connection information matches a dynamic mapping of session information; identifying an authentication type indicated by the dynamic mapping of session information; and determining whether to request a client certificate from the client device based on the authentication type.

In another example, the technology relates to a system comprising: a processor; and memory coupled to the processor, the memory comprising computer executable instructions that, when executed by the processor, perform a method. The method comprises: receiving, by a forward proxy device, a connection request from a client device, the connection request comprising connection information for connecting to a service; selecting, by the forward proxy device, a connection scheme for connecting the client device to the service; determining the connection information does not match a static mapping of connection information in the connection scheme; determining the connection information does not match a dynamic mapping of session information; identifying an authentication type for the connection request is unknown; and requesting a client certificate from the client device based on the authentication type Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory comprising computer executable instructions that, when executed by the processor, perform operations comprising:
receiving, by a forward proxy, a connection request from a client device, the connection request comprising connection information for connecting to a service implemented by a service device, the forward proxy being implemented between a network and the client device and being configured to enable termination of transport layer security (TLS) connection requests provided by the client device;
comparing the connection information to a static mapping of connection information stored by the forward proxy, the static mapping of connection information comprising a pattern corresponding to the service or the service device and being included in a connection scheme for connecting the client device to the service, the connection scheme indicating an authentication type for the connection request;
identifying the authentication type indicated by the connection scheme;
determining whether to provide a server certificate to the client device based on the authentication type, the server certificate being included in the connection scheme or stored in a data store of the forward proxy; and
processing the connection request based on whether the server certificate is to be provided to the client device.

2. The system of claim 1, wherein the connection scheme is defined by the service as part of a process for registering the service with the forward proxy.

3. The system of claim 1, further comprising requesting a client certificate from the client device based on the authentication type.

4. The system of claim 1, wherein the static mapping of connection information includes a pattern corresponding to access information for the service.

5. The system of claim 4, wherein the pattern comprises content for at least one of a hostname or an Internet Protocol (IP) address corresponding to the service.

6. The system of claim 1, wherein the identifying further comprises determining the connection information matches the static mapping of connection information in the connection scheme.

7. The system of claim 6, wherein determining the connection information matches the static mapping of connection information comprises using pattern matching techniques to compare the connection information to the pattern.

8. The system of claim 1, wherein the authentication type is one-way authentication.

9. The system of claim 1, wherein the connection scheme comprises an identifier of a server certificate for validating authenticity of the service.

10. The system of claim 1, wherein the operations further comprise:
establishing, by the forward proxy, a communication session between the client device and the service.

11. The system of claim 1, wherein the connection scheme comprises the static mapping of connection information and at least one of:
an identifier of a device role or function associated with the service;
connection settings for connecting to the service; or
an identifier or a location of a server certificate for the service.

12. A system comprising:
a processor; and
memory coupled to the processor, the memory comprising computer executable instructions that, when executed by the processor, perform operations comprising:
receiving, by a forward proxy, a connection request from a client device, the connection request comprising connection information for connecting to a service implemented by a service device, the forward proxy being implemented between a network and the client device and being configured to enable termination of transport layer security (TLS) connection requests provided by the client device;
comparing the connection information to a static mapping of connection information stored by the forward proxy, the static mapping of connection information comprising a pattern corresponding to the service or the service device and being included in a connection scheme for connecting the client device to the service, the connection scheme indicating an authentication type for the connection request;
identifying the authentication type indicated by the connection scheme, the identifying comprising:
determining the connection information does not match the static mapping of connection information; and
comparing the connection information to a dynamic mapping of session information; and
providing a server certificate to the client device based on the authentication type.

13. The system of claim 12, wherein the authentication type is two-way authentication, and wherein the operations further comprise requesting a client certificate from the client device.

14. The system of claim 12, wherein the dynamic mapping of session information comprises information related to communication sessions between client devices and the service.

15. The system of claim 12, wherein the identifying further comprises:
determining the connection information does not match the dynamic mapping of session information.

16. The system of claim 15, wherein the operations further comprise requesting a client certificate from the client device.

17. The system of claim 12, further comprising updating, by the forward proxy, an entry in the dynamic mapping of session information.

18. The system of claim 1, wherein the operations further comprise:
establishing, by the forward proxy, a communication session between the client device and the service.

19. A system comprising:
a processor; and
memory coupled to the processor, the memory comprising computer executable instructions that, when executed by the processor, perform operations comprising:
receiving, by a forward proxy, a connection request from a client device, the connection request comprising connection information for connecting to a service implemented by a service device, the forward proxy being implemented between a network and the client device and being configured to enable termination of transport layer security (TLS) connection requests provided by the client device;

comparing the connection information to a static mapping of connection information stored by the forward proxy, the static mapping of connection information comprising a pattern corresponding to the service or the service device and being included in a connection scheme for connecting the client device to the service, the connection scheme indicating an authentication type for the connection request;

identifying the authentication type, the identifying comprising:
- determining the connection information does not match the static mapping of connection information; and
- comparing the connection information to a dynamic mapping of session information; and terminating, by the forward proxy, the connection request.

20. The system of claim 18, wherein the identifying further comprises:
determining the connection information does not match a dynamic mapping of session information.

* * * * *